Dec. 30, 1969     T. FRAYER     3,486,801

BRAKE PRESSURE CONTROL VALVE

Filed Aug. 1, 1968     2 Sheets-Sheet 1

INVENTOR.
THEODORE FRAYER

BY

ATTORNEY

INVENTOR.
THEODORE FRAYER

BY

ATTORNEY

3,486,801
BRAKE PRESSURE CONTROL VALVE
Theodore Frayer, North Canton, Ohio, assignor to The Goodyear Tire & Rubber Company, Akron, Ohio, a corporation of Ohio
Filed Aug. 1, 1968, Ser. No. 749,353
Int. Cl. B60t 8/06
U.S. Cl. 303—21      12 Claims

ABSTRACT OF THE DISCLOSURE

A brake pressure control valve for use with a vehicle brake system having an anti-skid detector. The valve has a first stage pilot valve actuated by a signal from the skid detector which, in turn, controls hydraulic pressure for actuating a second stage power valve. The power valve has two or more axially aligned pistons which move simultaneously. One of the pistons is actuated by hydraulic pressure from the pilot valve. This piston, in turn, drives any of the other pistons in the power valve.

---

This invention relates to a brake pressure control valve for use with a vehicle brake system having an anti-skid detector.

BACKGROUND OF THE INVENTION

In the prior art, there are many types of pressure control valves designed for use with anti-skid detection devices to reduce or cut off brake pressure in response to the electrical signals from an anti-skid detector. The electrical signal usually operates an electromagnetic pilot valve which, in turn, moves a valve to various positions in response to the magnitude of the electrical signal to control the pressure of the hydraulic fluid to the brake and reduce the brake pressure when a skid condition occurs. A typical example of such a patent is U.S. Patent No. 3,286,734, issued to E. W. Hartshorne. Many of these prior art devices depend upon a main source of hydraulic supply involving the use of a sump for collecting the hydraulic fluid on the return line of the hydraulic system and a pump for pumping the hydraulic fluid from the sump under pressure to various parts of the hydraulic system where it is needed. Many of the existing control valves used with brake systems of this type have stub shafts and concentric lap fits which are difficult to machine to the proper tolerances to maintain uniform concentricity between the various parts of the piston or spool of the valve and the cylinder in which it is positioned. Many of the prior art control valves upon release of brake pressure, dump the brake fluid through the return line which passes through the second stage spool of the valve and through the filter in the return line. With such an arrangement, a check valve must be provided around the second stage spool to open and permit brake pressure to flow to the pressure inlet of the second stage spool. There is an additional problem encountered in some of the existing valves which involves an undesirable shuttling back and forth of the second stage piston when the inlet pressure is released.

OBJECTS OF THE INVENTION

A primary object of this invention is to provide a simplified brake pressure control valve which is easy to produce and in which the parts are such a design that the required tolerances and concentricity of the parts may be easily maintained.

Another object of the invention is to provide a control valve in which the concentric lap fits of prior art valves are eliminated.

Still another object of the invention is to provide more flexibility in valve sizing and design by making the metering portion independent of the control area.

A still further object of the invention is to provide a valve in which undesirable shuttling of the second stage piston is eliminated.

These and other objects of the invention will become more fully apparent as the description proceeds in the following specification and the attached drawings.

DESCRIPTION OF THE PREFERRED EMBODIMENTS

Figure 1:
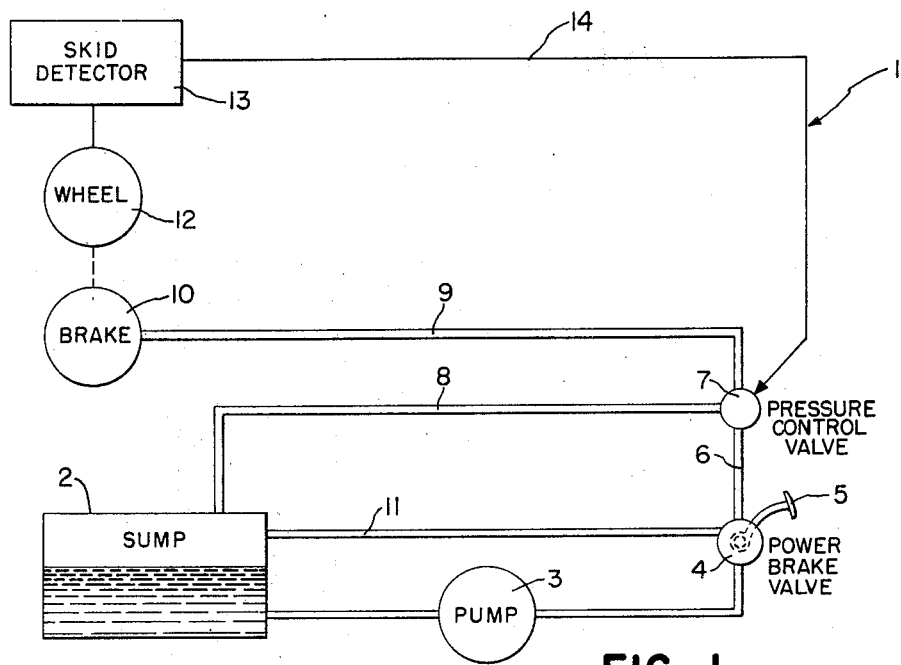
FIGURE 1 is a block schematic diagram of a vehicle braking system utilizing a pressure control valve proposed by the invention.

Referring now to FIGURE 1 of the drawings, the numeral 1 indicates generally an anti-skid and braking system. The system 1 includes a hydraulic fluid sump 2 connected to a pump 3 which provides hydraulic fluid under pressure to a power brake valve 4 controlled by a foot pedal 5 operated by a vehicle operator. The power brake valve 4 regulates the amount of fluid under pressure passing therethrough dependent upon the position of the pedal 5. The hydraulic fluid under pressure is then directed through a conduit 6 to a pressure control servo valve 7 which comprises the invention, wtih the valve 7 adapted to direct the hydraulic fluid under pressure through a conduit 8 back to the sump 2, or through a conduit 9 to a brake unit 10. A conduit 11 extends from the valve 4 to the sump 2. The brake 10 is operatively connected to a vehicle wheel 12 which drives a skid detector 13. The electrical output from the skid detector 13 is directed as an input control to the pressure control valve 7 through the line 14.

Thus, to broadly understand the purpose of the pressure control valve 7, it can be said that the valve 7 merely modulates hydraulic pressure from the power brake valve 4 to the brake unit 10 as deemed proper by the electrical signal from the skid detector. Thus, the pressure control valve 7 acts as a three-way three-position gate which may reduce brake pressure by opening the brake line to the return line, increase brake pressure by opening the inlet pressure line to the brake line, or hold a given pressure by shutting off both the brake and return lines.

Figure 2:
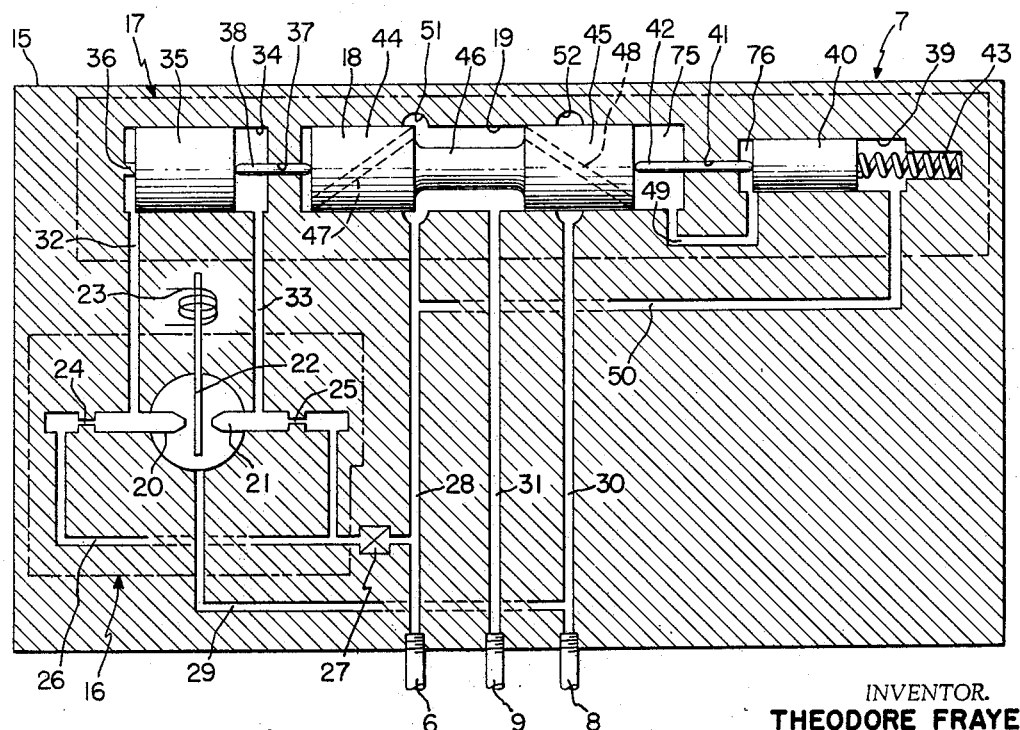
FIGURE 2 is a cross-sectional view of one embodiment of the control valve of this invention with the valve in a normal position with no electrical input from the skid detector and with the brake pressure increasing to full inlet pressure.
Figure 3:
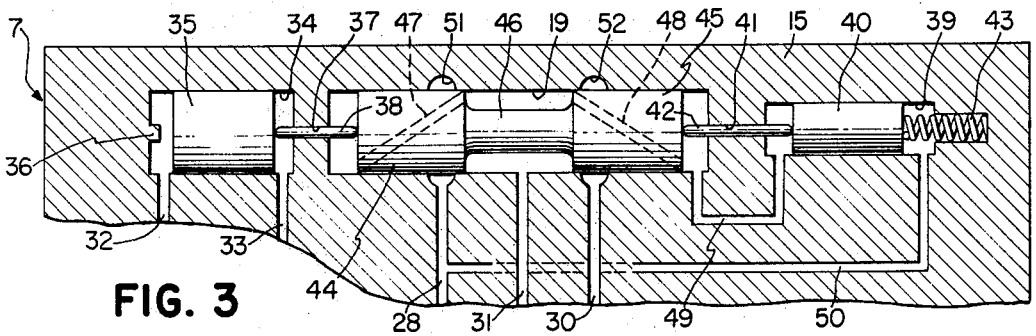
FIGURE 3 is a fragmentary cross-sectional view similar to FIGURE 2 with the valve maintaining a modulated reduced brake pressure.
Figure 4:
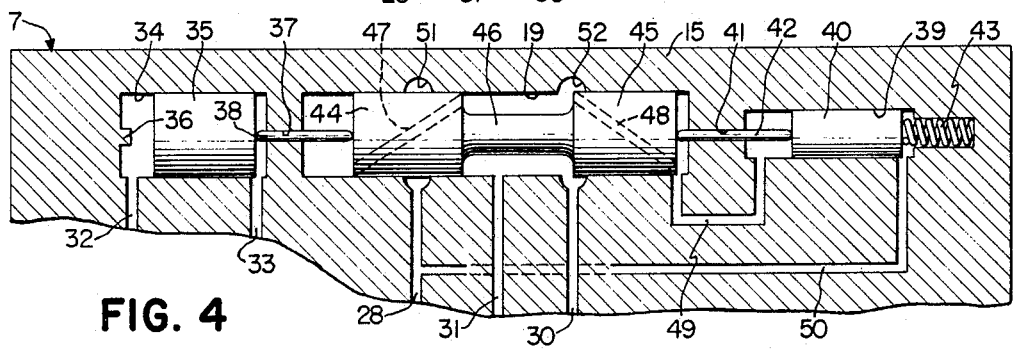
FIGURE 4 is a fragmentary cross-sectional view similar to FIGURE 2 with the valve in a position of reducing brake pressure to zero.

In order to properly understand the operation of the pressure control valve 7, reference should be had to FIGURES 2 through 4 of the drawings. Referring now in particular to FIGURE 2, the valve 7 has a housing 15. Located within the housing 15 is a first stage pilot valve 16 which regulates pressure to control the position of a second stage power valve 17. The second stage valve 17 has a pressure regulator piston 18 axially slidable within a cylinder 19 which is in communication with the inlet pressure conduit 6, the brake pressure conduit 9 and the return conduit 8 which returns hydraulic fluid to the sump 2. The first stage pilot valve 16, as shown in this embodiment, is a conventional flapper type valve having a pair of opposed nozzles 20 and 21 between which is positioned an adjustable flapper 22 actuated by a coil 23 which receives signals from the skid detector 13, through the line 14. The flapper 22, upon a given signal to the coil 23, is moved toward one of the nozzles 20 and 21 and away from the opposite nozzle. When the signal changes, the position of the flapper 22 will also change. The nozzles 20 and 21 are connected through orifices 24 and 25 respectively to an inlet passage 26 which joins through a filter 27 to an inlet pressure passage 28 which, in turn, is connected to the inlet pressure conduit 6. The valve 16 has a pressure return passage 29 which joins a return passage 30 connecting the return conduit 8 with the cylinder 19 of the valve 17. A passage 31 carries hydraulic fluid pressure from the cylinder 19 to the brake conduit 9. Hydraulic pressure entering the valve 7 from the conduit 6 passes through the passage 28, to the cylinder 19 and through the filter 27, through the passage 26 where it divides and passes through opposite orifices 24 and 25 and then through the opposite nozzles 20 and 21. The nozzles 20 and 21 restrict the flow of the hydraulic fluid, and the pressure is returned through the passage 29, to the passage 30 and then to the conduit 8. Part of the pressure controlled by the nozzle 20 passes through a passage 32, and part of the pressure controlled by the nozzle 21 passes through a passage 33. The passages 32 and 33 lead to opposite ends of a cylinder 34 in which is slidably located a control piston 35; thus a hydraulic bridge is formed across each end of the cylinder 34. In other words, control pressure from the valve 16 is transmitted through the passages 32 and 33 to the cylinder 34 to control the relative force of the piston 35 within the cylinder 34. A piston stop 36 may be provided at one end of the cylinder 34. The cylinders 34 and 19 are joined together by a centrally located opening 37 passing between the adjacent end walls of the cylinders. A push rod 38 passes through and seals the opening 37 and butts against the adjacent ends of the pistons 35 and 18. On the end of the cylinder 19 opposite from the cylinder 34 is a third cylinder 39 containing a feed-back and reference piston 40. A centrally located opening 41 connects the adjacent ends of the cylinders 19 and 39 in the same manner that the opening 37 connects the cylinders 19 and 34. A push rod 42 similar to the rod 38 passes through the opening 41 and bears against the adjacent ends of the pistons 18 and 40. A spring 43 located in the opposite end of the cylinder 39 from the openisg 41 biases the piston 40 against the push rod 42 which, in turn, bears against the piston 18 to urge it against the push rod 38 which, in turn, bears against the piston 35 and urges it toward the piston stop 36. Thus, it may be seen that the pistons 18, 35 and 40 are all in axial alignment with each other and are all biased in the same direction by the spring 43. The control piston 35 is of larger diameter than the feed-back piston 40 to utilize the linear portion of the hydraulic bridge formed by the first stage valve 16. FIGURE 2 is a pictorial schematic view arranged for ease of explanation. In actual construction, the piston 40 would bear directly against the piston 18 since the pressure in the chamber 75 is the same as the chamber 76.

The piston 18 has two lands spaced apart by a center shaft 46 of smaller diameter than the lands. The lands 44 and 45 each have conduits 47 and 48 respectively, connecting the respective outer end of the piston with the inner end of each land, in such manner that the center cavity between the two lands is always in communication with the cavity formed between the outer end of each land and the end wall of the cylinder 19. This means that the pressure against each end wall of the cylinder 19 will be the same as the pressure in the center cavity which communicates with the passage 31 to the brake conduit 9. This condition sets up a hydraulic balance of the piston 18 within the cylinder 19 so that the forces acting to move the cylinder 18 come from either the control piston 35 or the feed-back and reference piston 40 is biased by the spring 43. A passage 49 connects the adjacent ends of the cylinder 19 and the cylinder 39 thereby causing the end of the cylinder 39 opposite the spring 43 to carry a pressure which is the same as the pressure passing through the passage 31 to the brake conduit 9. A passage 50 connects the spring end of the cylinder 39 with the inlet pressure passage 28 which supplies inlet pressure through the valve 17 to the brake.

It may now be seen that the proximity of the flapper 22 to either the nozzle 20 or the nozzle 21 determines the pressure in the lines 32 and 33 which determine the force of the control piston 35 within the cylinder 34. The pressure differential between each end of the cylinder 34 determines the force which the piston will exert and when there is an unbalance in pressure in the passages 32 and 33, the piston 35 will move in one direction or the other depending upon which passage carries the highest pressure. In order to move the piston 35 to the right, the pressure in the passage 32 must be greater than the pressure 33 and this pressure differential will cause a force to be exerted on rod 37 and valve piston 18. This first stage driving force will be balanced by the pressure differential force on piston 40 and the less significant spring force. This force balance is what causes piston 18 to shuttle and dump brake pressure as in FIGURE 4, or maintain a modulated brake pressure as in FIGURE 3. This balance of forces on piston 18 is always maintained by shuttling to decrease or increase brake pressure to the valve commanded by the force on piston 18 by piston 35. In FIGURE 2, the pressure in the passages 32 and 33 is such that the pistons 35, 18 and 40 are moved to the left a sufficient distance for the land 44 to clear the annular groove 51 and permit pressure from the passage 28 to flow through the center cavity of the cylinder 19 into the passage 31 to the brake conduit 9. Simultaneously, the land 45 closes off the annular groove 52 and thereby blocks any pressure in the center cavity from being released through the passage 30 to the return conduit 8. When the piston 18 is in this position, the brake 10 is receiving full pressure from the conduit 6 passing through the valve 7 and then through the conduit 9. An increase in the pressure in the passage 32 and a decrease in pressure in the passage 33 will cause the pistons 35, 18 and 40 to move to the right to the position shown in FIGURE 3. The lands 44 and 45 are in a position to close off the annular grooves 51 and 52 respectively thereby closing off both the pressure passage 28 and the return passage 30 from the brake passage 31.

In the position shown in FIGURE 3, the valve 7 holds a given reduced pressure in the brake conduit 9. If the pressure maintained in the conduit 9 is still too high to alleviate the skid condition, a signal from the skid detector 13 again operates the first stage pilot valve 16 to further change the pressure in the passages 32 and 33 and simultaneously move the pistons 35, 18 and 40 even further to the right to a position shown in FIGURE 4.

In the position maintained by the piston 18 in FIGURE 4, the land 44 continues to close off incoming pressure from the inlet pressure line 28 and in addition, the land 45 is in a position to permit pressure in the brake passage 31 to be released through the return passage 30. As soon as the skid condition has been alleviated, a signal from the skid detector causes the first stage valve 16 to change the pressure output through passages 32 and 33 and again, readjust the position of the cylinders 35, 18 and 40.

It should be understood that the flapper valve 16 is merely used as a matter of illustration for the first stage pilot valve. Any type of valve which can provide a pair of outlet lines having a pressure differential between the lines to control the cylinder 35 can be used with this invention.

Figure 5:
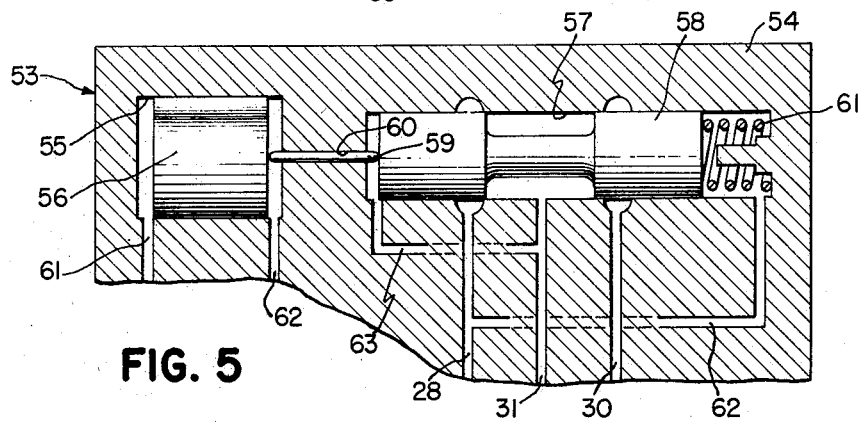
FIGURE 5 is a fragmentary cross-sectional view of a modification of the valve shown in FIGURE 2 with the valve in the position of holding reduced pressure.

Another embodiment of the invention is illustrated in FIGURE 5 in which a valve 53 is similar to the valve 7 except that the feed-back reference piston 40 has been eliminated. The valve 53 has a housing 54. Located within the housing 54 is a cylinder 55 containing a control piston 56. Also located within the housing is a cylinder 57 which carries a piston 58 similar to the piston 18 in FIGURE 2 except that the passages 47 and 48 in the lands of the piston have been eliminated. The pistons 56 and 58 are axially aligned in the same manner as the pistons 35 and 18. The piston 56 is larger in diameter than the piston 58 to utilize the linear portion of the hydraulic bridge formed by the first stage. A push rod 59 passes through an opening 60 in the wall between the ends of the cylinder 55 and 57. The rod 59 contacts the adjacent ends of the pistons 56 and 58 and serves the same purpose as the rod 38. A pair of pressure control passages 61 and 62 supply pressure to opposite ends of the cylinder 55 from a first stage pilot control valve such as the valve 16 shown in FIGURE 2. Since the first stage valve used with the embodiment shown in FIGURE 5 can be identical to that shown in FIGURE 2, it has not been included in FIGURE 5 for the purpose of simplicity. The cylinder 57 is similar to the cylinder 19 since it communicates with the inlet pressure passage 28, the brake pressure passage 31 and the return passage 30. The cylinder 57 has annular grooves 51 and 52 identical to those in the cylinder 19. One end of the cylinder 57 contains a bias spring 61 which biases the piston 58 through the push rod 59 against the piston 56 to urge both pistons to the left. A passage 62 connects the spring end of the cylinder 57 to the pressure passage 28. Passage 63 connects the opposite end of the cylinder 57 to the brake pressure passage 31. The piston 58 is shown in FIGURE 5 in a position similar to that held by the piston 18 in FIGURE 3. In this position, the piston is holding a constant reduced pressure in the brake line. It will be obvious that when a change in pressure in the passages 61 and 62 from the first stage pilot valve occurs, the piston 56 will move the piston 58 to a different position to reduce or increase the brake pressure depending upon the type of signal received from the anti-skid detector. If a skid condition occurs and less pressure is required in the brake line, the piston 58 will move to the right to connect the brake pressure passage 31 with the return passage 30 and thereby dump the hydraulic fluid in the line to the sump and reduce the brake pressure in the brake line. The primary balance of forces is that a differential pressure across piston 56 (with pressure in passage 61 greater than passage 62) will cause a differential in pressure across the valve piston 58 because of the feed-back feature provided by passage 63. If the skid condition has been alleviated, the piston 58 will move to the left to connect the inlet pressure passage 28 with the brake pressure passage 30. This will restore normal operating pressure to the brake.

Figure 6:
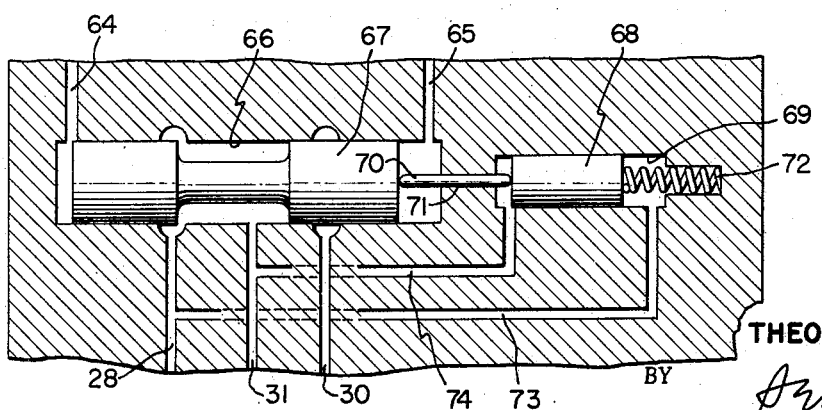
FIGURE 6 is a fragmentary cross-sectional view of another modification of the invention with the valve shown in a position to permit full pressure to the brake.

FIGURE 6 illustrates another modification of the invention in which passages 64 and 65 from the first stage pilot valve are connected directly to the ends of a cylinder 66 to directly drive the pressure regulating piston 67 by applying pressure at each end thereof rather than driving a control piston such as the piston 56 which drives the piston 58 in FIGURE 5. The cylinder 66, like the cylinder 57, connects to an inlet pressure passage 28, a brake pressure passage 31 and a return passage 30. The valve shown in FIGURE 6 has a feed-back and reference piston 68 similar to the piston 40 shown in FIGURE 2. The piston 68 is slidably located within a cylinder 69 in axial alignment with the piston 67. A push rod 70 connects the pistons 67 and 68 through an opening 71 in in the wall between the adjacent ends of cylinders 66 and 69. A spring 72 biases the piston 68 through the push rod 70 against the piston 67 to urge the piston to the left of the cylinder 66. The spring end of the cylinder 69 is connected by a passage 73 to the inlet pressure passage 28. The opposite end of the cylinder 69 is connected by a passage 74 to the brake pressure passage 31.

In FIGURE 6, the piston 67 is shown in a position similar to the piston 18 in FIGURE 2 in which the inlet pressure from the passage 28 passes into the cylinder 66 and then into the brake pressure passage 31 to apply full pressure to the brake. It will, of course, be understood that the movement of the piston 67 is quite similar to the piston 18 or the piston 58 in the two previously described embodiments and the same balance of forces prevail. When pressure in the passage 64 is greater than pressure in the passage 65, the valve piston 67 will shuttle until a proportional pressure reduction in passage 31 and in passage 74 is achieved.

Thus it may be seen that the objects of this invention have been achieved by the foregoing apparatus. The manner in which a plurality of pistons are arranged in axial end-to-end alignment within the housing eliminates the conventional stub shafts and necessary concentric lap fits of existing valves. A valve as shown in FIGURE 2 has control areas independent of the metering portion of the main control system. This provides more flexibility when sizing valves with the first stage flow and time response parameters as fixed values. The present invention eliminates undesirable shuttling of the pressure control piston as depicted in arrangement in FIGURE 2 and FIGURE 6, which results in premature wear on the valve components. Since valve designs FIGURE 2 and FIGURE 6 do not shuttle to return when inlet pressure is released, the normal provision for a check valve from brake to inlet pressure is eliminated. This check valve is necessary in valves that shuttle with decreasing inlet pressure if brakes are parked by closing off the return line. Although the first stage pilot valve has been shown in the same housing as the second stage power valve, it should be understood that the pilot valve need not be contained in the same housing as the second stage valve and need only be connected to the second stage valve by pressure control conduits.

Various other changes can be made in the illustrative embodiments shown herein without departing from the scope of this invention.

What is claimed is:

1. A brake pressure control valve for regulating the pressure between a pressure supply line, a brake line and a return line of a brake system, the valve comprising:
   (A) a first stage pilot valve responsive to a signal from an anti-skid detector;
      (1) said valve having a hydraulic output control pressure means, and
   (B) a second stage power valve responsive to the first stage pilot valve and comprising:
      (1) at least two separate pistons axially aligned in end-to-end relationship within a cylinder housing,
      (2) one of said pistons being a driving piston which is axially movable by the hydraulic output control pressure from the first stage valve,
      (3) the other piston being an axially movable driven piston,
      (4) one of said pistons being a pressure regulator piston located in a cylinder in communication with the pressure supply line, the brake line and the return line,
      (5) a separate axially slidable member positioned within the cylinder housing between the adjacent ends of the driving piston and the driven piston, and
      (6) bias means urging the driven piston and the axially slidable member toward the driving piston so that the respective ends of the slidable member bear against the adjacent ends of the driving piston and the driven piston and cause any axial movement of the driving piston to be imparted to the driven piston through the slidable member.

2. A valve as claimed in claim 1 wherein the output pressure means of the pilot valve positions the driving piston which, in turn, positions the pressure regulator piston.

3. A valve as claimed in claim 2 wherein the second stage valve has a feed-back reference piston driven by the pressure regulator piston.

4. A valve as claimed in claim 3 wherein the hydraulic pressure is balanced at each end of the pressure regulating piston thereby eliminating the need for a particular size ratio between the driving piston and the pressure regulating piston.

5. A valve as claimed in claim 1 wherein the output pressure means of the pilot valve is connected directly to the cylinder containing the pressure regulator piston.

6. A valve as claimed in claim 1 including a feed-back reference piston which is driven by the pressure regulator piston.

7. A valve as claimed in claim 1 wherein the pressure regulator piston is a spool type piston having two lands of identical diameter connected by a center shaft of smaller diameter than the lands and wherein one of the lands opens and closes the supply pressure line and the other land opens and closes the return line at the location where the lines communicate with the cylinder containing the pressure regulator piston.

8. A valve as claimed in claim 7 wherein each of the lands has a passageway therethrough connecting the axially outer end of the land with the axially inner end thereof to permit the same pressure to be maintained on each end of the piston as is maintained in the central portion of the cylinder in the area between the lands.

9. A valve as claimed in claim 1 wherein the second stage power valve has three axially aligned pistons each of which is axially slidable within a separate cylinder cavity, the cylinder cavities being axially aligned and spaced apart by a wall portion of the cylinder housing, each wall portion having a centrally located opening in axial alignment with the cylinders and a mechanical means passing through each opening for mechanically linking each piston to the next adjacent piston.

10. A valve as claimed in claim 9 wherein one of the pistons is a pressure regulator piston positioned between a control piston and a feed-back piston, the regulator piston being driven by the control piston and the feedback piston being driven by the regulator piston.

11. A valve as claimed in claim 10 wherein the end diameter of the control piston is larger than the end diameter of the feed-back piston.

12. A valve as claimed in claim 10 wherein the hydraulic pressure is balanced at each end of the pressure regulating piston thereby eliminating the need for maintaining a particular size ratio between the driving piston and the other pistons of the second stage power valve.

References Cited
UNITED STATES PATENTS

| | | | |
|---|---|---|---|
| 3,095,067 | 7/1963 | Kolm | 137—625.62 |
| 3,188,148 | 6/1965 | Eaton | 137—625.64 X |
| 3,260,273 | 7/1966 | Hayner | 137—625.63 X |
| 3,286,734 | 11/1966 | Hartshorne | 137—625.64 |

MILTON BUCHLER, Primary Examiner

JOHN J. McLAUGHLIN, Jr., Assistant Examiner

U.S. Cl. X.R.

137—625.62, 625.63, 625.64; 303—10, 68

PO-1050
(5/69)

UNITED STATES PATENT OFFICE
CERTIFICATE OF CORRECTION

Patent No. 3,486,801    Dated December 30, 1969

Inventor(s) Theodore Frayer

It is certified that error appears in the above-identified patent and that said Letters Patent are hereby corrected as shown below:

Column 6, line 56, delete "in end-to-end relationship".

SIGNED AND
SEALED
JUN 23 1970

(SEAL)
Attest:

Edward M. Fletcher, Jr.
Attesting Officer

WILLIAM E. SCHUYLER, JR.
Commissioner of Patents